US012405189B2

(12) United States Patent
Scardini Villela et al.

(10) Patent No.: US 12,405,189 B2
(45) Date of Patent: Sep. 2, 2025

(54) SYSTEM AND METHOD FOR UNIFIED SAMPLING OF PARTICULATE MATTER FOR REDUCING THE DISPERSION OF RESULTS IN VEHICLE EMISSIONS TESTS

(71) Applicants: Petróleo Brasileiro S.A.-Petrobras, Rio de Janeiro (BR); Instituto De Tecnologia Para O Desenvolvimento-LACTEC, Curitiba (BR)

(72) Inventors: Antonio Carlos Scardini Villela, Rio de Janeiro (BR); Tadeu Cavalcante Cordeiro De Melo, Rio de Janeiro (BR); Juliano Pazello Chedid, Curitiba (BR); Dennis Rempel, Curitiba (BR); Luiz Carlos Corrêa, Curitiba (BR); Luiz Carlos Daemme, Curitiba (BR); Pedro Caffaro Vicentini, Rio de Janeiro (BR); Renato De Arruda Penteado Neto, Curitiba (BR)

(73) Assignees: Petróleo Brasileiro S.A.—Petrobras, Rio de Janeiro (BR); Instituto De Tecnologia Para O Desenvolvimento-LACTEC, Curitiba (BR)

( * ) Notice: Subject to any disclaimer, the term of this patent is extended or adjusted under 35 U.S.C. 154(b) by 282 days.

(21) Appl. No.: 18/081,845

(22) Filed: Dec. 15, 2022

(65) Prior Publication Data
US 2023/0184634 A1 Jun. 15, 2023

(30) Foreign Application Priority Data
Dec. 15, 2021 (BR) ...................... 10 2021 025280 4

(51) Int. Cl.
*G01N 1/22* (2006.01)
*G01N 1/38* (2006.01)
*G01N 15/06* (2006.01)

(52) U.S. Cl.
CPC ......... *G01N 1/2205* (2013.01); *G01N 1/2252* (2013.01); *G01N 1/38* (2013.01); *G01N 15/0618* (2013.01); *G01N 2001/2255* (2013.01)

(58) Field of Classification Search
CPC .. G01N 1/2247; G01N 1/2252; G01N 1/2205; G01N 1/38; G01N 15/0618; G01N 2001/2255; G01N 15/06; G01N 2015/0046
See application file for complete search history.

(56) References Cited

U.S. PATENT DOCUMENTS

| 4,633,706 A | 1/1987 | Ito et al. |
| 5,546,788 A | 8/1996 | Dickow |

(Continued)

FOREIGN PATENT DOCUMENTS

| DE | 10220154 A1 * | 2/2003 | .......... G01M 15/102 |
| GB | 2214449 A * | 9/1989 | .......... G01N 1/2205 |

*Primary Examiner* — Benjamin R Schmitt
(74) *Attorney, Agent, or Firm* — Morrison & Foerster LLP

(57) ABSTRACT

The present invention provides a system and a method for determining the particulate matter mass in vehicle emissions tests, seeking to improve weighing resolution and reduce experimental uncertainties. The invention presents two embodiments, in which in the first embodiment there is a branch in the vehicle emissions collection equipment that allows to integrate the particulate matter generated during the entire test into a single filter. In the second embodiment, there are two branches in which one branch has a filter for the accumulation of the particulates produced in phases 1

(Continued)

and 2 of the test and the other branch has another filter for the accumulation of the particulates in phases 2 and 3.

12 Claims, 2 Drawing Sheets

(56) References Cited

U.S. PATENT DOCUMENTS

| | | | |
|---|---|---|---|
| 6,405,577 B2* | 6/2002 | Hanashiro | G01F 1/44 73/23.31 |
| 2003/0159496 A1* | 8/2003 | McDonald | G01N 1/2258 73/23.2 |
| 2018/0340461 A1* | 11/2018 | Otsuki | G01N 1/44 |
| 2021/0078028 A1 | 3/2021 | Woll | |

* cited by examiner

SYSTEM AND METHOD FOR UNIFIED SAMPLING OF PARTICULATE MATTER FOR REDUCING THE DISPERSION OF RESULTS IN VEHICLE EMISSIONS TESTS

CROSS-REFERENCE TO RELATED APPLICATION

This application claims priority to Brazilian Application No. 10 2021 025280 4 filed on Dec. 15, 2021, and entitled "SYSTEM AND METHOD FOR UNIFIED SAMPLING OF PARTICULATE MATTER FOR REDUCING THE DISPERSION OF RESULTS IN VEHICLE EMISSIONS TESTS," the disclosure of which is incorporated herein by reference in its entirety.

FIELD OF INVENTION

The present invention is related to the area of measurement of polluting gas emissions from internal combustion motor vehicles.

DESCRIPTION OF THE STATE OF THE ART

The vehicle emissions test is used to measure the emission of pollutants from vehicles equipped with internal combustion engines. The Brazilian standard that defines the procedures for measuring vehicle emissions is NBR6601 of May/2021, entitled "Veículos rodoviários automotores leves—Determinação de hidrocarbonetos, monóxido de carbono, óxidos de nitrogênio, dióxido de carbono e material particulado no gás de escapamento" (Light Road motor vehicles-Determination of hydrocarbons, carbon monoxide, nitrogen oxides, carbon dioxide and particulate matter in the exhaust gas). It was developed using as a basis the test standards for vehicle emissions (FTP-75 cycle) recommended by the EPA—Environmental Protection Agency, an environmental agency in the United States of America. NBR 6601 determines that the measurement must be carried out in a vehicle positioned on a dynamometer, which simulates road load conditions, in a laboratory that presents controlled environmental conditions.

During the test, the vehicle is subjected to a speed cycle as a function of time that simulates an urban route. The test has three different phases in which emissions are collected, stored and analyzed at the end of each of these three phases.

Particulate matter (PM) is the generic term used to describe solid and volatile particles present in the exhaust gases (emissions) of vehicles. Its emission is one of the main problems for public health in large centers, contributing to the deterioration of air quality and also environmental problems such as global warming. For sampling the particulate matter present in the exhaust gas, an aliquot of this gas is directed to filters that retain the particles present in the sample. These filters are weighed on a precision scale (micrograms) before and at the end of the emissions test. Thus, it is possible to quantify the emission, in mass, of the sample under test by the difference in mass retained in the filters.

With the evolution of the legislation, which imposes increasingly restrictive limits to the vehicle emissions, and with the inclusion of particulate matter emission standards for vehicles with spark ignition and direct fuel injection as of 2022 in Brazil, the sampling and the determination of particulate matter mass become critical. The difficulty that laboratories currently face in determining this mass is due to the low levels of particulate matter generated by vehicles. In the procedure established in the NBR 6601 standard, measurements are carried out on three sets of filters, one for each phase of the test which, due to the low emission, end up receiving small amounts of the particulate matter, increasing the uncertainty, and measuring errors of the retained mass, since the scales used operate close to their precision and uncertainty limits.

NBR 6601 determines that the emission measurement must be carried out in a vehicle on a dynamometer, which simulates road load conditions, in a laboratory with controlled environmental conditions. The vehicle is subjected to a speed cycle as a function of time, which simulates an urban path. The test has three phases in which emissions are collected, stored and analyzed at the end of each phase. The test consists of two cycles, one with a cold start and the other with a hot start, with an interval of 10 min between them. The result is the weighted average between the cold and hot start cycles, presented in grams per kilometer of each pollutant.

The cold start cycle is divided into two phases. The first, transitory phase with cold start, is characterized by the cold start of the vehicle, with 505 s. Second, cold start stabilized phase with 867 s including engine shutdown. The third, transient phase with hot start, begins after a 10-minute interval, being the same as the first phase, differing in terms of the hot start of the motor. Then, the test is completed, but NBR 6601 considers, for calculation purposes, the repetition of the values measured in the second phase, for the composition of the stabilized phase with hot start, which was not performed in the test. The emission masses are determined by the final concentrations of the sample and the total volume of the mixture obtained in each of the three steps. For the collection of the particulate matter generated in each of the phases, sampling filters are used. The result is obtained by the weighted sums of the emissions of the exhaust gas components by mass, obtained in the different phases of the test, and are calculated according to Equation 1 below, for each pollutant:

$$YMP = 0.43 \times \left(\frac{(YTF + YEF)}{(DTF + DE)}\right) + 0.57 \times ((YTQ + YEQ) + (DE + DTQ))$$

Where YMP is the weighted emission of each pollutant, in grams per kilometer (g/km); YTF is the mass emission of each pollutant in the transient phase with cold start, in grams (g); YEF is the mass emission of each pollutant in the stabilized phase with cold start, in grams (g); YTQ is the mass emission of each pollutant in the transient phase with hot start, in grams (g); YEQ is the mass emission of each pollutant in the stabilized phase with hot start, in grams (g) (execution can be exempted, using the values obtained in the stabilized phase of the cold start instead); DTF is the distance traveled during the transient phase with a cold start, in kilometers (km); DE is the distance traveled during the stabilized phase, in kilometers (km); DTQ is the distance traveled during the transient phase with a hot start, in kilometers (km).

Before the invention, the measurement of the particulate matter was done individually in each of the test phases, as recommended by the vehicular emissions standard and explained in the previous paragraphs. Due to the very low PM mass emitted by current motor vehicles, after the completion of each phase, the filter measurement process generated a high measurement uncertainty and, in some cases, negative mass values.

The determination of the particulate matter (PM) mass in an innovative way, in relation to what is stated in the aforementioned standard, seeks to improve the weighing resolution and reduce experimental uncertainties, that is the reason for this patent proposal.

Document US20210078028A1 refers to a device that dilutes the exhaust gases of an engine, and a particulate measurement system that uses said device.

Document U.S. Pat. No. 5,546,788A discloses a method and apparatus for measuring the concentration of particles in the exhaust gases of internal combustion engines.

Document U.S. Pat. No. 4,633,706A discloses a system for measuring amounts of particulates exhausted from a vehicle internal combustion engine, such as a diesel engine, comprising a dilution tunnel into which exhaust gas is introduced and mixed with and diluted by clear air.

Priorities reveal systems used to measure particulate matter in vehicle emissions tests.

However, the previous publications present alternative devices or methods for determining gases and the amount of particles, using a sample of diluted exhaust gases as established in the standard. Which is not the objective of the present invention, and which will be demonstrated below.

In view of the difficulties present in the state of the art mentioned above, and for solutions of determining the particulate matter (PM) mass in order to significantly reduce the measurement uncertainty, it arises the need to develop a technology capable of performing effectively and that complies with environmental and safety guidelines. The current state of the art mentioned above does not have the unique characteristics that will be presented in detail below.

OBJECT OF THE INVENTION

It is an object to provide a more reliable measurement of the particulate matter emissions in vehicles, when compared to what is currently done, which will provide technical support for a more accurate determination of the particulate matter mass emitted.

It is also an object to reduce the problem of low process accuracy, resulting in a reduction in the number of tests and, consequently, savings for laboratories and an increase in their productivity.

It is also an object to propose a reduction in the cost of using particulate matter sampling filters and also in the time (man-hour) for the task of preparing and weighing the filters used in the emissions tests.

BRIEF DESCRIPTION OF THE INVENTION

The present invention provides a system and a method for determining the particulate matter mass emitted by vehicles, seeking to improve weighing resolution and reduce experimental uncertainties.

The invention presents two embodiments, in which in the first embodiment there is a branch in the vehicle emissions collection equipment that allows to integrate the particulate matter generated during the entire test into a single filter. In the second embodiment, there are two branches in which one branch has a filter for the accumulation of particulates produced in the transient (phase 1) and stabilized (phase 2) phases with a cold start of the test and the other branch have another filter for the accumulation of particulates in the phases stabilized with cold start (phase 2) and transient with hot start (phase 3).

BRIEF DESCRIPTION OF DRAWINGS

The present invention will be described in more detail below, with reference to the attached figures which, in a schematic and not limiting of the inventive scope, represent examples of its realization. The drawings show.

DETAILED DESCRIPTION OF THE INVENTION

Figure 1:
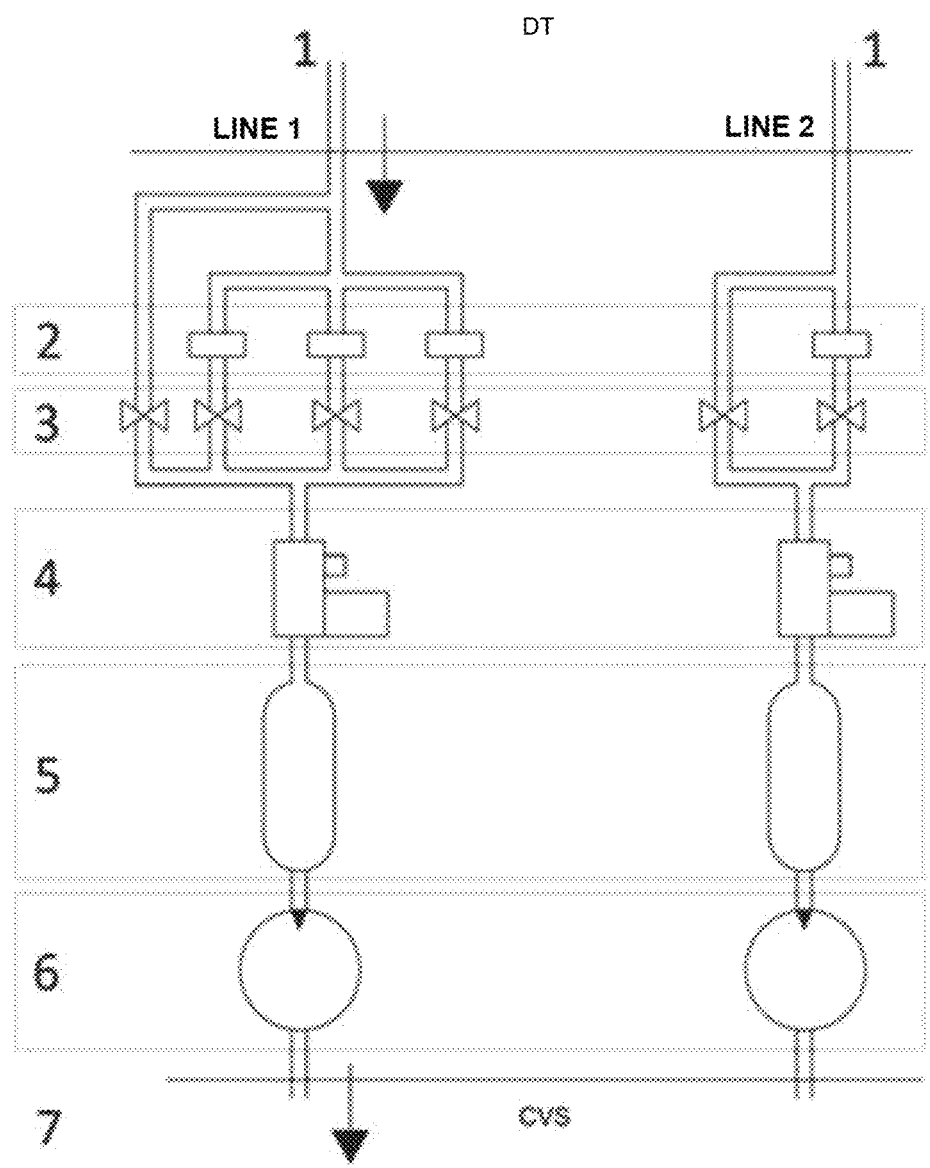
FIG. 1 illustrates a particulate matter collection system (single channel)

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

As the accumulated mass values in each of the three phases of the test are very low and the precision scales operate at the limit of their accuracy ranges, the solution adopted was to create an additional branch in the vehicle emissions collection equipment that allows to integrate the particulate matter generated throughout the test on a single filter. With this process, there is an improvement in the representativeness of the sample (increase in the amount), facilitating the measurement process and there is also a reduction in the accumulation of measurement uncertainty of more filters, as occurs in the collection model divided by phases of NBR 6601, in which three filters are weighed. This branch inserted in the system is additional to the existing ones so that the collection of particulate matter in each of the phases is not impaired, and this process can be carried out in parallel or independently.

Searches in the technical literature concerning the subject matter do not indicate the existence of a solution that is similar to the invention. The creation of an additional channel to the existing ones, which collects the emissions from the three phases of the cycle in a single filter, demanded the elaboration of an engineering project, the manufacture of parts and the assembly of instruments to allow its construction, in addition to the programming collection automation software.

Possibly the reason why a similar invention has not yet been found is that, until relatively recently, vehicles generated a high particulate matter mass that could be measured with microbalances with acceptable uncertainty. Modern vehicles produce much lower levels of particulate matter which has increased the uncertainty of measurement by microbalances.

A new way of measuring MP would be to accumulate the mass produced in phases 1 and 2 in one filter, and in a second filter, accumulate the masses of phases 2 and 3. Thus, two filters would be used instead of three filters as determined by NRR 6601. In this case, in addition to savings in the number of filters, it would be possible to reduce measurement uncertainty, as the mass accumulated in the filter would correspond to two phases instead of a single one. It is important to emphasize that the invention can be reflected in improvements in the existing standard and can be applied to other emission test cycles.

Thus, two innovative proposals are being presented:
a) An additional channel to the existing three in which the mass of three phases will be accumulated.
b) Two additional channels to the existing ones in which particulate matter from phases 1 and 2 (channel 01) and phases 2 and 3 (channel 02) will be accumulated.

The solutions made available by manufacturers for measuring the particulate matter mass are limited to equipment and instruments that only aim to meet the pre-established conditions by standard.

The collection method can be applied to any vehicle emissions analysis system using a constant volume sampler. Petrobras and Lactec need to improve the technique established by the standard, with a view to deepening studies on the impact of fuels, especially when it comes to new generation engines. The variation in properties and compositions of fuel formulations can result in different emissions of particulate matter. A methodology that better highlights such differences allows for more qualified product development. This was the main motivating element of this invention. Engine and vehicle manufacturing companies may also be interested in the technique in order to develop solutions that minimize particulate matter emissions. It should be noted that, conceptually, the idea is simple, but the result of its application is highly positive and allows for greater precision in the quality of test results, a decrease in the number of dynamometer tests and savings with the reduction in the use of filters.

Vehicle emission gases are extracted from the dilution tunnel, passing through filters responsible for retaining particulate matter. The temperature is measured in the flow rate meter/controller and the flow rate is controlled by the flow control instrument (mass/flow). Then the gases are directed to a balloon which purpose is to reduce the pulsation caused by the pumping system in the flow meter. Then, they are taken to the constant volume sampler or discarded. The particulate matter sample collection probe must:

a) be installed in the front of the flow, at the point where the exhaust gas and the dilution air are homogenized (near the center line of the tunnel and at a distance of at least ten times the diameter of the tunnel, from the point where the gas enters the dilution tunnel);
  b) be far enough radially from sampling to the HFID (Hydrocarbon Flame Ionization Detector), if applicable, in order to be free from influences such as vacuums produced by the probe;
  c) have a minimum internal diameter of 12.7 mm;
  d) be configured in such a way that at least one particulate matter filter can be selected for each measurement phase.

The flow through the particulate matter probe must be kept at a constant value, within 5%. The sample gas temperature must be maintained at a constant value, within 2.8° C.

Figure 2:
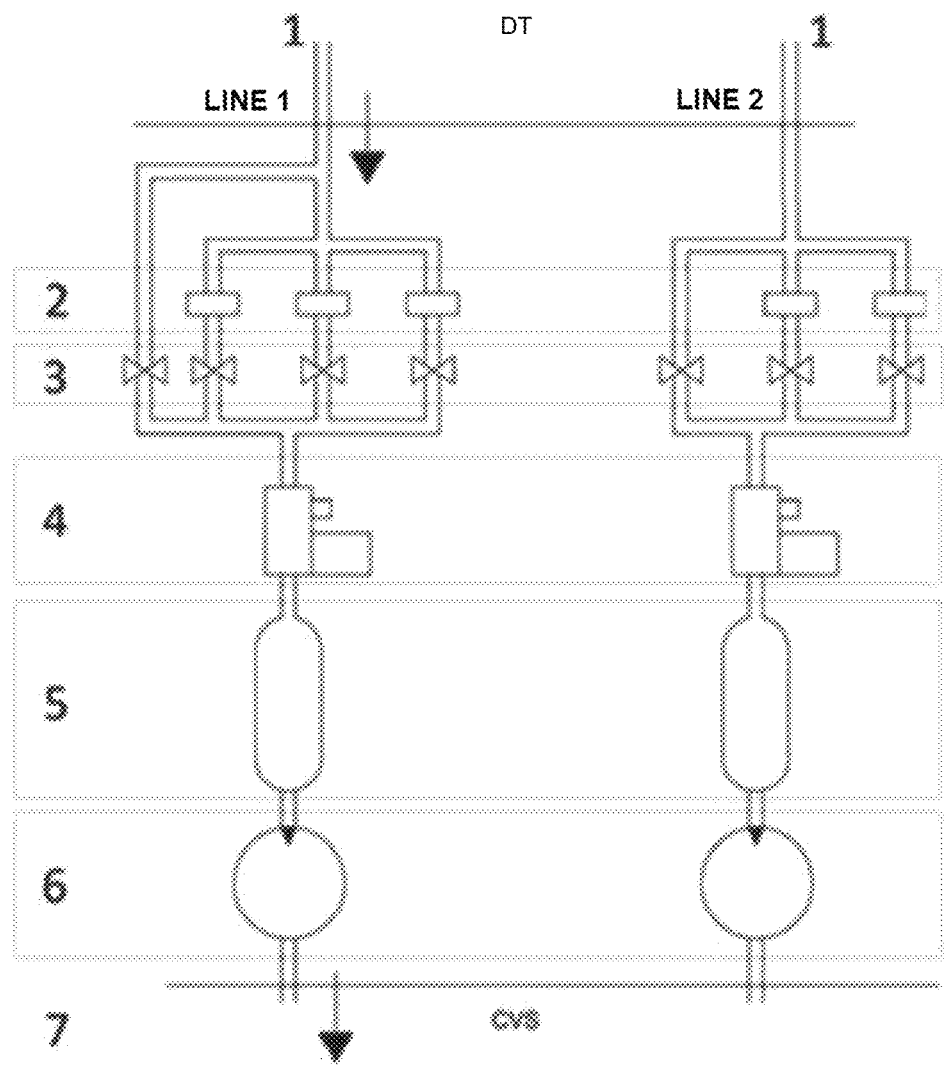
FIG. 2 illustrates a particulate matter collection system (channels for phases 1 and 2 and 2 and 3).

FIG. 1 illustrates the particulate matter collection system coming from a dilution tunnel (DT), wherein the system designated as line 1 is a conventional application of particulate matter collection for up to three test phases. Line 2 illustrates the developed sampling system, wherein the flow is directed to a single filter. The layout of the configuration shown is only illustrative and may take other forms. In the image the numbers indicate: (1) particulate matter sampling probe; (2) filter holder, responsible for packing the filter that will retain the particulate matter; (3) valves responsible for directing the flow to the filters in each phase of the test, or to a by-pass in the steps before and after the start of the test; (4) indicates the mass flow meter, responsible for measuring the sample flow during the test; (5) cylinder responsible for attenuating possible flow pulsations; (6) sampling pump; (7) return of the sample to the constant volume sampler (CVS). FIG. 2 illustrates the conventional assembly scheme and the scheme for the new strand mentioned above, which includes the collection of the particulate matter in a filter for phases 1 and 2 and in another filter for phases 2 and 3.

Table 1 presents the results of the methodology adopted by NBR 6601 and the results obtained with the collection in a single filter by the developed system. It is observed that in the current methodology, the coefficient of variation was 30%, above the average value of 14% used by several authors to indicate a low sample dispersion. The values obtained with the developed methodology present a coefficient of variation value of 13%, less than half of the value obtained by the current quantification method, demonstrating greater reliability in the particulate matter quantification process, which will be very important in improving the analysis of the effects of the fuel composition on the formation of the particulate matter. The results were obtained in both methodologies in simultaneous collections during vehicle emissions tests carried out based on NBR 6601.

TABLE 01

Results of particulate matter mass (mg/km) using the method recommended by NBR 6601 and the method developed (single channel).

| Test | Mass MP (mg/km) | |
| --- | --- | --- |
| | NBR 6601 | Developed method |
| 1 | 0.34 | 0.35 |
| 2 | 0.24 | 0.32 |
| 3 | 0.42 | 0.31 |
| 4 | 0.21 | 0.34 |
| 5 | 0.41 | 0.43 |
| Average | 0.32 | 0.35 |
| Standard Dev | 0.10 | 0.05 |
| Coef. Variation | 30% | 13% |

The methodology object of the invention can contribute to the development of fuels, vehicles and engines that result in lower emissions of particulate matter, helping the evolution of air quality indices in cities and, consequently, in people's health.

The invention resulted in greater reliability in the process of measuring vehicle emissions, due to the greater accuracy in the technique of measuring the particulate matter mass.

Vehicle tests require the use of fuels for engine operation. They also require the use of calibration gases from measuring instruments. Additionally, there is a need to consume service gases and electricity, especially to power the dynamometer and the laboratory's peripheral systems. And the exposed factors are directly associated with the generation of elements that impose undesirable environmental effects. The reduction in the amount of tests promoted by the invention reported here reduces the environmental impacts of an emissions laboratory. From the point of view of the environmental (regulatory) legislation, there are environmental benefits due to the improved accuracy in determining the particulate matter mass emitted by motor vehicles.

The invention claimed is:

1. A sampling system of particulate matter for vehicle emission tests, the system comprising:
   a probe configured to sample vehicle emissions carrying particulate matter, the probe directing the sampled particulate matter into a channel of a plurality of channels;
   a filter holder positioned within at least one of the plurality of channels, wherein at least one of the plurality of channels does not include a filter holder;

valves arranged and configured to direct the vehicle emissions into a specified channel of the plurality of channels;

a sampling pump configured to flow the vehicle emissions through at least one channel of the plurality of channels; and a mass flow meter arranged to receive the vehicle emissions from the plurality of channels;

a balloon configured to reduce pulsations in the mass flow meter caused by the sampling pump;

a cylinder configured to reduce pulsations in the mass flow meter caused by the sampling pump; and a return arranged to direct the flow to a constant volume sampler.

2. The system according to claim 1, wherein the probe has a minimum internal diameter of 12.7 mm.

3. The system according to claim 1, wherein the filter holder is configured to hold a filter that is configured to retain the particulate matter.

4. The system according to claim 3, wherein the valves are configured to direct the vehicle emissions to at least one channel of the plurality of channels that includes the filter holder, holding the filter, in each phase of the test, or to the at least one channel of the plurality of channels not including a filter holder before and after the test.

5. The system according to claim 1, wherein the mass flow meter is configured to measure the vehicle emissions during the test.

6. The system of claim 1, wherein the plurality of channels comprises three channels, the system further comprising an additional channel in which a three-phase mass will be accumulated.

7. The system of claim 1, wherein the plurality of channels comprise three channels, wherein the filter holder is a first filter holder, wherein the particulate matter from steps 1 and 2 of an emission test are directed through a first of the plurality of channels including the first filter holder and steps 2 and 3 of the emissions test are directed through the second of the plurality of channels including a second filter holder, wherein the particulate matter is accumulated within filters housed by the first filter holder and the second filter holder.

8. A unified sampling method of particulate matter for reducing dispersion of results in a vehicles emissions test, the method comprising:

extracting vehicle emission gases from a dilution tunnel (DT) to a hydrocarbon flame ionization detector by the probe of claim 1, wherein the probe is installed in front of the flow at a point where the vehicle emission gases and dilution air are homogenized, the point being a sufficient radial distance from the point;

directing the vehicle emission gases extracted by the probe to a first channel of a plurality of channels prior to a start of an emission test, the first channel of the plurality of channels being free of a filter and filter holder;

directing the vehicle emission gases into a second channel of the plurality of channels during the vehicle emission test, the second channel including a filter holder with a filter;

measuring a mass of the filter prior to the vehicle emission test;

measuring a mass of the filter after the vehicle emission test and determining a difference between the mass of the filter before and after the vehicle emission test;

measuring a temperature and controlling a flowrate, by a flow control instrument, of the vehicle emission gases during the vehicle emission test; and directing the vehicle emission gases to a balloon that reduces the pulsation caused by a pumping system in a mass flow meter during the vehicle emission test; and directing the vehicle emission gases to a constant volume sampler.

9. The method according to claim 8, wherein the probe is located at a center line of the DT and at a distance of at least ten times a diameter of the DT, from a point where the gas enters the DT.

10. The method according to claim 8, wherein the probe is free from influences of vacuums produced by the particulate matter sample probe.

11. The method according to claim 8, wherein the flow rate of the vehicle emission gases is maintained at a constant value, within 5%.

12. The method according to claim 8, wherein the temperature of the vehicle emission gases is maintained at a constant value, within 2.8° C.

* * * * *